US012789628B2

(12) United States Patent
Wilsdorf et al.

(10) Patent No.: US 12,789,628 B2
(45) Date of Patent: Nov. 10, 2026

(54) MODULAR INSTRUMENT PANEL ASSEMBLY WITH ENHANCED MOUNTING AND UPDATE MECHANISMS FOR VEHICLES

(71) Applicant: Volkswagen Aktiengesellschaft, Wolfsburg (DE)

(72) Inventors: Simone Wilsdorf, Wolfsburg (DE); Kristin Lisa von Szadkowski, Lotte (DE); Dij Jayaratna, San Francisco, CA (US); Markus Müller, Osloß (DE)

(73) Assignee: Volkwagen Aktiengesellschaft, Wolfsburg (DE)

( * ) Notice: Subject to any disclaimer, the term of this patent is extended or adjusted under 35 U.S.C. 154(b) by 255 days.

(21) Appl. No.: 18/895,190

(22) Filed: Sep. 24, 2024

(65) Prior Publication Data

US 2026/0084534 A1 Mar. 26, 2026

(51) Int. Cl.
*B60K 37/10* (2024.01)
*B60K 35/50* (2024.01)
*B62D 65/14* (2006.01)

(52) U.S. Cl.
CPC .............. *B60K 37/10* (2024.01); *B60K 35/50* (2024.01); *B62D 65/14* (2013.01); *B60K 2360/46* (2024.01)

(58) Field of Classification Search
CPC ........ B60K 37/10; B60K 37/20; B60K 35/50; B60K 2360/46; B60K 2360/828; B60K 2360/834; B60K 2360/84; B60K 2360/65; B60K 2360/816; B62D 65/14
USPC ........................................ 296/70, 72; 180/90
See application file for complete search history.

(56) References Cited

U.S. PATENT DOCUMENTS

| | | | | | |
|---|---|---|---|---|---|
| 4,717,195 | A * | 1/1988 | Okuyama | B62D 25/14 | 296/72 |
| 4,924,957 | A * | 5/1990 | Gigla | B60K 35/22 | 296/70 |
| 4,929,182 | A * | 5/1990 | Hyogo | B60K 35/50 | 180/90 |
| 5,788,532 | A * | 8/1998 | Takiguchi | B60K 35/10 | 361/740 |
| 5,919,058 | A * | 7/1999 | Tashiro | B60K 35/60 | 439/374 |

(Continued)

FOREIGN PATENT DOCUMENTS

| | | | |
|---|---|---|---|
| DE | 102020209145 | A1 | 1/2022 |
| DE | 102021112858 | A1 | 11/2022 |

(Continued)

*Primary Examiner* — Wenwei Zhuo
(74) *Attorney, Agent, or Firm* — Peter Zura; LOZA & LOZA, LLP

(57) ABSTRACT

Technologies and techniques for a modular instrument panel assembly for vehicle interiors, featuring enhanced mounting and update mechanisms. The assembly includes an outer instrument panel, a support bracket with vertical and horizontal sections, and a mounting bracket for secure attachment to the vehicle's dashboard. The support bracket incorporates multiple attachment points, reinforced ribs, and flanges for structural integrity. Spring-loaded alignment guides and locking mechanisms ensure precise alignment and secure attachment. The modular design allows for easy installation, removal, and customization of electronic and mechanical components.

20 Claims, 9 Drawing Sheets

(56) References Cited

U.S. PATENT DOCUMENTS

| | | | | |
|---|---|---|---|---|
| 6,073,987 | A * | 6/2000 | Lindberg | B62D 25/142 296/70 |
| 2002/0003354 | A1 * | 1/2002 | Inoue | B60K 35/22 296/70 |
| 2024/0140202 | A1 * | 5/2024 | Park | B60K 35/00 |
| 2024/0190515 | A1 * | 6/2024 | Schmid | B60K 35/50 |

FOREIGN PATENT DOCUMENTS

| | | | | |
|---|---|---|---|---|
| DE | 102021118778 | A1 | 11/2022 | |
| WO | WO-0112458 | A1 * | 2/2001 | B60K 37/00 |

* cited by examiner

MODULAR INSTRUMENT PANEL ASSEMBLY WITH ENHANCED MOUNTING AND UPDATE MECHANISMS FOR VEHICLES

TECHNICAL FIELD

The present disclosure relates to vehicle interior components, specifically to instrument panels used in vehicles. More specifically, the present disclosure relates to a modular instrument panel assembly with enhanced mounting and update mechanisms designed for ease of installation, removal, and customization, facilitating both sustainability and adaptability in vehicle design. The concepts disclosed herein aim to improve the flexibility and longevity of vehicle interiors by allowing for efficient updates and replacements of the instrument panel and its components.

BACKGROUND

Vehicle instrument panels, commonly referred to as dashboards, serve as critical components within a vehicle's interior, providing housing for various controls, displays, and interfaces that facilitate driver interaction and information retrieval. Traditional instrument panel assemblies are typically fixed and integrated into the vehicle structure during manufacturing, resulting in limited flexibility for updates, repairs, or customization post-production.

Conventional vehicle instrument panels are designed as integral, non-modular units that incorporate various mechanical, electrical, and electronic components. These assemblies generally include a structural framework, displays and controls, airbags, and aesthetic elements. The structural framework provides mechanical support and integrates with the vehicle's chassis. Displays and controls encompass speedometers, tachometers, fuel gauges, infotainment screens, and HVAC controls. Airbags and other safety components are also integrated into the dashboard to ensure passenger safety, while trims, finishes, and materials enhance the vehicle's interior appeal.

A common configuration in the prior art involves a fixed, monolithic design where the instrument panel is installed as a single unit during the vehicle manufacturing process. This design, while robust, presents significant limitations. For instance, the lack of modularity in traditional instrument panels results in a cumbersome and labor-intensive process when updating or replacing individual components. This limitation becomes particularly evident when attempting to upgrade electronic systems or integrate new technologies, as the entire dashboard must often be dismantled to access and replace specific parts. Additionally, the integrated nature of conventional instrument panels complicates repairs and maintenance. Damage to any part of the instrument panel, whether due to wear and tear or an accident, often requires extensive labor to access and repair the affected components. This not only increases repair costs but also extends vehicle downtime, causing inconvenience to the owner.

From a sustainability perspective, traditional instrument panels pose significant challenges. The use of diverse materials and the fixed design make disassembly for recycling purposes labor-intensive and economically unviable. As environmental concerns and regulations become more stringent, the automotive industry faces increasing pressure to develop more sustainable interior components that facilitate end-of-life recycling and minimize waste.

One primary drawback is the lack of modularity in traditional designs. The fixed nature of these panels means that even minor updates or customizations require significant disassembly of the vehicle's interior. This rigidity limits the ability of manufacturers to offer personalized options to consumers and hampers the integration of evolving technologies. In a rapidly advancing technological landscape, the ability to easily update vehicle components is crucial for maintaining competitiveness and meeting consumer expectations.

Repair and maintenance challenges further exacerbate the limitations of existing instrument panel configurations. The integrated design means that accessing internal components for repair requires dismantling large sections of the dashboard. This not only increases labor costs but also prolongs vehicle downtime, impacting the overall ownership experience. For example, replacing a faulty display screen might necessitate the removal of the entire instrument panel, a process that is both time-consuming and costly.

The sustainability of traditional instrument panels is another critical concern. The fixed design and use of various materials make recycling at the end of the vehicle's life cycle a complex and inefficient process. Moreover, the inflexibility in customization options offered by conventional instrument panels limits their appeal to consumers seeking personalized driving experiences. Factory presets often do not cater to individual preferences, and aftermarket modifications can be cumbersome and potentially unsafe. The inability to easily swap or upgrade components restricts the potential for customization, diminishing the overall value proposition for modern consumers who increasingly prioritize personalization in their vehicle choices.

SUMMARY

While traditional instrument panel assemblies have served their purpose in the past, their limitations in modularity, repairability, sustainability, and customization highlight the need for a new approach. The present disclosure addresses these challenges by introducing a modular instrument panel assembly with enhanced mounting and update mechanisms, offering a flexible, sustainable, and user-centric solution for vehicle interiors. Furthermore, the assembly includes safety features designed to handle various load cases, including crash scenarios, ensuring the instrument panel remains secure and functional.

In some examples, a modular instrument panel assembly for a vehicle includes a mounting bracket configured to be affixed to an upper portion of the vehicle's dashboard. The assembly also comprises a support bracket that attaches to this mounting bracket and is intended to receive an outer instrument panel. The support bracket features a vertical section with apertures for mounting to a lower portion of the vehicle's dashboard. Additionally, a horizontal section of the support bracket extends towards the outer side of the dashboard, incorporating multiple attachment points and flanged edges to provide rigidity. The support bracket also houses several spring-loaded alignment guides within integrated mounting receptacles and bushings, which are configured to align and secure the outer instrument panel during its installation. These alignment guides include a fuse mechanism to handle various load cases, including crash impacts. Guiding channels within the support bracket facilitate the sliding motion required to install the outer instrument panel.

In some examples, a method is disclosed for assembling a modular instrument panel assembly for a vehicle involves affixing a mounting bracket to the upper portion of the vehicle's dashboard. A support bracket is then attached to the mounting bracket. This support bracket includes a vertical section with apertures for mounting to a lower portion of the dashboard and a horizontal section that extends towards the outer dashboard side, incorporating multiple attachment points and flanged edges for added rigidity. Multiple spring-loaded alignment guides, equipped with fuse mechanisms to handle load cases including crashes, are integrated within the mounting receptacles of the support bracket to align and secure the outer instrument panel during installation. The sliding motion of the outer instrument panel into place is facilitated by guiding channels integrated into the support bracket.

In some examples, a modular instrument panel assembly is disclosed, where the assembly includes a mounting bracket that can be affixed to an upper dashboard portion of the vehicle. A support bracket is attached to the mounting bracket and is designed to receive an outer instrument panel. The support bracket comprises a vertical section with mounting apertures for attaching to the lower dashboard portion, and a horizontal section that extends towards the outer side of the dashboard, featuring multiple attachment points and flanged edges for rigidity. Additionally, the support bracket integrates several spring-loaded alignment guides within mounting receptacles, equipped with fuse mechanisms to ensure proper alignment and secure attachment of the outer instrument panel during installation. Guiding channels within the support bracket facilitate the sliding motion of the outer instrument panel. Furthermore, the assembly includes multiple detachable fasteners, allowing the outer instrument panel to be securely attached to the support bracket while also enabling easy removal and replacement of the panel.

In some examples, a modular instrument panel assembly for a vehicle includes a mounting bracket configured to be affixed to an upper dashboard portion of the vehicle. The assembly also comprises a support bracket configured to attach to the mounting bracket and to receive an outer instrument panel. The support bracket features a vertical section with apertures for mounting to a lower dashboard portion of the vehicle, and a horizontal section extending towards the outer side of the dashboard, incorporating multiple attachment points and flanged edges for rigidity. The support bracket also houses several spring-loaded alignment guides within integrated mounting receptacles and bushings, equipped with fuse mechanisms, which are configured to align and secure attachment of the outer instrument panel during installation. Additionally, guiding channels are integrated into the support bracket to facilitate the sliding motion required to install the outer instrument panel. The assembly further includes an integrated electrical connection system configured to establish electrical connectivity between the outer instrument panel and the vehicle's electrical system during installation.

While traditional instrument panel assemblies have served their purpose in the past, their limitations in modularity, repairability, sustainability, and customization highlight the need for a new approach. The present disclosure addresses these challenges by introducing a modular instrument panel assembly with enhanced mounting and update mechanisms, offering a flexible, sustainable, and user-centric solution for vehicle interiors.

BRIEF DESCRIPTION OF THE DRAWINGS

The present invention is illustrated by way of example and not limitation in the figures of the accompanying drawings, in which like references indicate similar elements and in which:

FIGS. 6A-6D illustrate the initial alignment and attachment steps, including the insertion of attachment points and the securing of the base structure, and FIGS. 6E-6H depict the final locking and securing mechanisms, including the positioning and fastening of reinforcement brackets and support braces, according to some aspects of the present disclosure.

DETAILED DESCRIPTION

Figure 1:
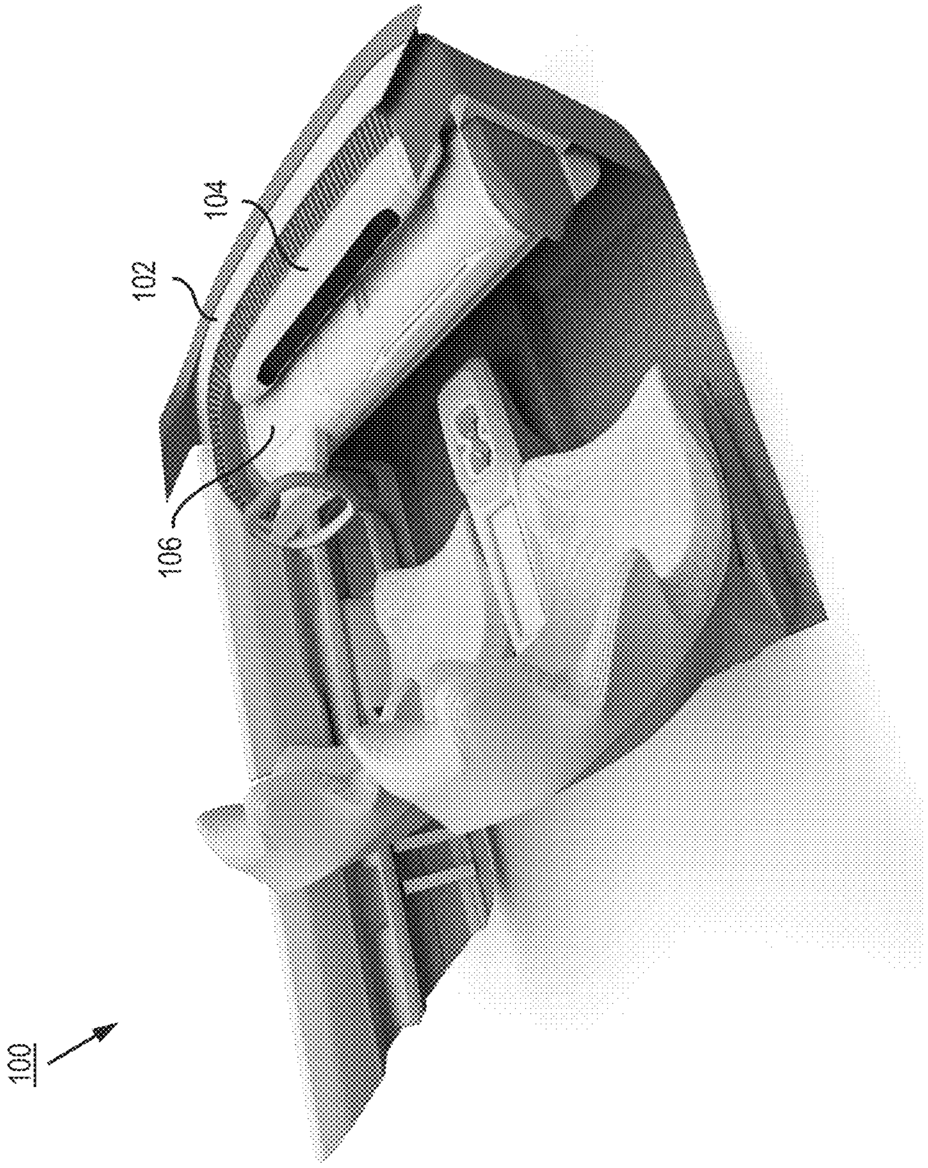
FIG. 1 is a front perspective view of a vehicle instrument panel assembly, illustrating the overall configuration of the modular components and their spatial relationships within the vehicle interior, according to some aspects of the present disclosure.

The figures and descriptions provided herein may have been simplified to illustrate aspects that are relevant for a clear understanding of the herein described devices, structures, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Exemplary embodiments are provided throughout so that this disclosure is sufficiently thorough and fully conveys the scope of the disclosed embodiments to those who are skilled in the art. Numerous specific details are set forth, such as examples of specific components, devices, and methods, to provide this thorough understanding of embodiments of the present disclosure. Nevertheless, it will be apparent to those skilled in the art that specific disclosed details need not be employed, and that exemplary embodiments may be embodied in different forms. As such, the exemplary embodiments should not be construed to limit the scope of the disclosure. In some exemplary embodiments, well-known processes, well-known device structures, and well-known technologies may not be described in detail.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a front perspective view of a vehicle interior 100 according to some aspects of the present disclosure. The vehicle interior 100 shows the relation of the instrument panel assembly 104 within the vehicle, relative to an inner dashboard side 106 that includes the steering wheel, and an outer dashboard side 102 nearest the windshield.

The instrument panel assembly 104 is configured to fit within the vehicle interior 100 and may integrate various modular components. The assembly 104 may include a main instrument panel structure that forms the foundation of the instrument panel. This main structure includes a robust structural framework that provides rigidity and support, ensuring that the instrument panel maintains its shape and securely holds attached components. The instrument panel assembly 104 may further include designated display/control areas that are ergonomically positioned to be easily accessible to the driver and front passenger. These areas facilitate interaction with the vehicle's systems by housing various displays and control interfaces.

Multiple mounting points are strategically located on the instrument panel assembly 104, as disclosed in greater detail with respect to FIGS. 2-6H, discussed below. These mounting points allow for the easy installation and removal of modular components, supporting the modularity and customization of the instrument panel. This design enables users to upgrade or replace components as needed, promoting ongoing customization and technological updates.

The modular design of the instrument panel assembly 104 offers significant advantages, including the ability to easily install, replace, or upgrade various components. This flexibility ensures that the vehicle interior can adapt to changing user needs and preferences. The integration of mounting points and a robust structural framework provides both stability and ease of maintenance, enhancing the overall user experience. The instrument panel assembly 104 is configured to integrate seamlessly with the vehicle's structural framework, ensuring a stable and secure fit. The inner dashboard side 106 and the outer dashboard side 102 are designed to align with the instrument panel assembly 104, providing a cohesive and ergonomic design.

In some aspects, the instrument panel assembly 104 may be made from a combination of materials that provide durability and ease of manufacturing. These materials may include high-strength plastics, metals, and composite materials. Specifically, materials such as PET (polyethylene terephthalate), which has good recycling properties, are suitable for use. The use of monomaterials like PET facilitates recycling processes and offers high variance in applications for interior components through various material technologies such as 3D knitting, foam injection molding, and pressed composites. Other recyclable plastics such as PP (polypropylene) and PA (polyamide) can also be utilized.

In some examples, the instrument panel assembly 104 can accommodate various electronic and mechanical components, including displays, control interfaces, sensors, and actuators. The modular nature of the instrument panel allows for these components to be easily integrated, replaced, or upgraded, supporting a wide range of functionalities and user preferences.

Figure 2:
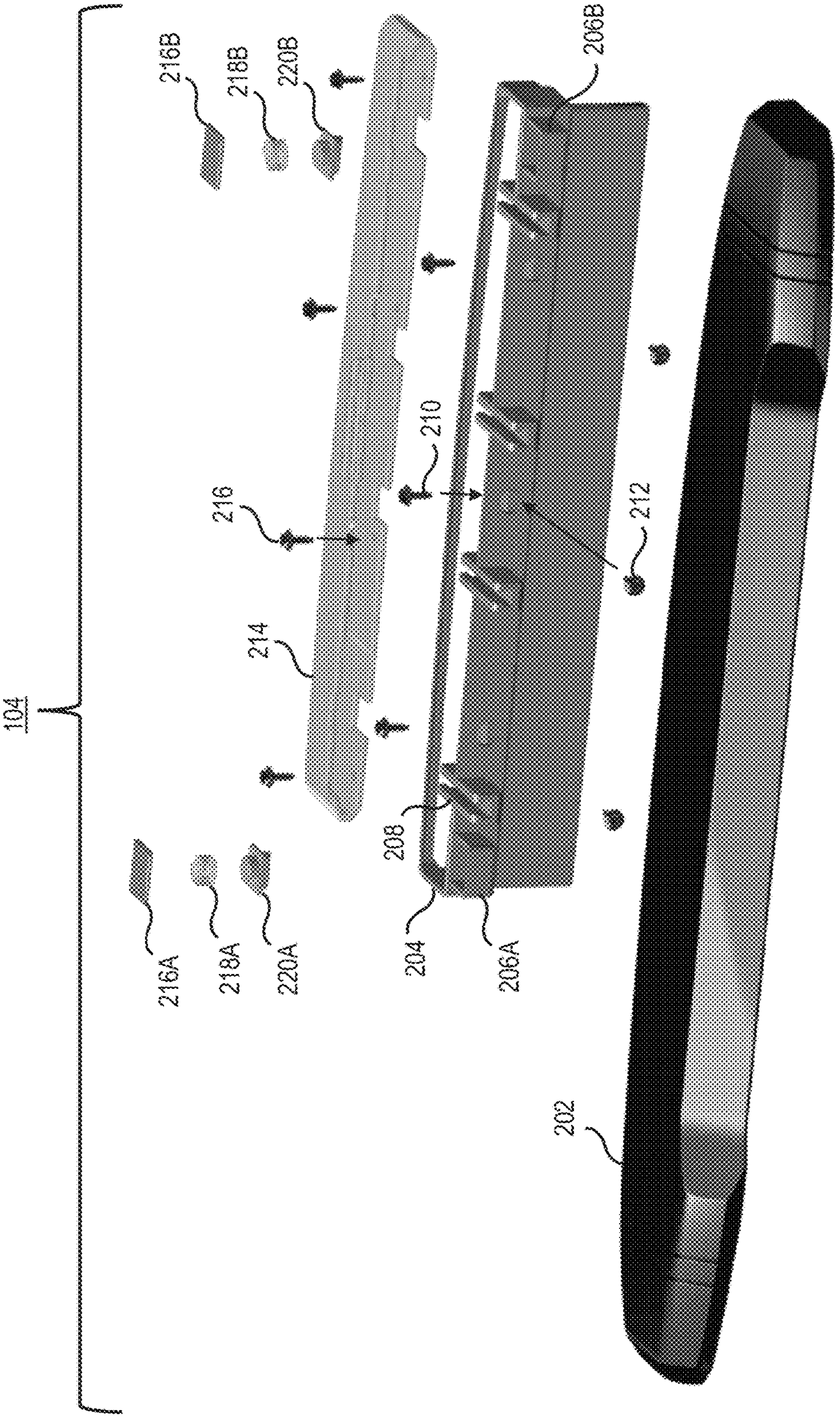
FIG. 2 is an exploded view of the instrument panel assembly, showing the individual modular components, including the base structure, attachment mechanisms, and housings, according to some aspects of the present disclosure.

FIG. 2 is an exploded view of the instrument panel assembly 104 according to some aspects of the present disclosure. This figure illustrates the individual modular components of the instrument panel assembly 104, including the outer instrument panel 202, a support bracket 204, and a mounting bracket 214, and how they fit together.

The instrument panel assembly 104 includes an outer instrument panel 202 that serves as the primary structure for housing various electronic components. The outer instrument panel 202 is designed to accommodate displays, control interfaces, sensors, and actuators, providing an organized and protected environment for these elements.

The outer instrument panel 202 is supported by a support bracket 204, which facilitates the easy installation and removal of the outer instrument panel 202. The support bracket 204 is strategically positioned to provide structural support and ensure that the outer instrument panel 202 remains securely attached while allowing for straightforward disassembly for maintenance or upgrades.

The support bracket 204 features a multi-faceted design, incorporating both vertical and horizontal sections as can be seen in the figure that work in tandem to provide comprehensive support and stability. The vertical section is configured to interface with a lower dashboard portion (e.g., 304, below). This section includes a series of mounting apertures arranged in a strategic pattern to align with corresponding attachment points on the vehicle's dashboard. These apertures are designed to accommodate a plurality of screws 210, which secure the bracket to the dashboard, ensuring a stable connection. Additionally, the vertical section may include reinforced ribs and flanges that run along its length, enhancing its structural integrity and providing additional support to withstand dynamic forces encountered during vehicle operation.

The horizontal section of the support bracket 204 extends outward towards the outer dashboard side 102, creating a platform for attaching the outer instrument panel 202. This section features a flat surface with multiple attachment points (hidden in the figure), including threaded inserts on one side and mounting receptacles 206A, 206B on the other. These attachment points facilitate the installation of various modular components, including the spring-loaded alignment guides 218A, 218B, and related hardware. The precise positioning of these attachment points ensures that the components are securely fastened and correctly aligned with the rest of the instrument panel assembly. The horizontal section is also contoured to follow the curvature of the dashboard, ensuring a seamless fit within the vehicle interior.

The edges of the horizontal section may be flanged to provide additional rigidity and prevent deformation under load. The flanged edges create a boxed structure that enhances the overall strength of the bracket, ensuring that it can support the weight of the outer instrument panel 202 and any attached components. Integrated into the horizontal section are guiding channels 208, which run along its length. These channels may be configured with smooth, low-friction surfaces to facilitate the sliding motion of the outer instrument panel 202 during installation, ensuring precise alignment. The channels may be dimensioned to accommodate slight variations in panel dimensions, ensuring a snug and secure fit.

The support bracket 204 also includes spring-loaded alignment guides 218A, 218B, which are housed within the mounting receptacles 206A, 206B. These guides ensure that the modular components are correctly positioned during installation, maintaining precise alignment and secure attachment. The mounting receptacles are designed to securely house the alignment guides and related hardware, providing a reliable and stable connection for the alignment guides, ensuring they remain securely attached to the support bracket 204, even under dynamic conditions.

The support bracket 204 couples to a mounting bracket 214, which is affixed to the outer dashboard side 102 nearest the windshield. The mounting bracket 214 is secured using a plurality of screws 216 to ensure a stable connection. Channels 208 are integrated into the instrument panel assembly 104 to guide the outer instrument panel 202 into position during installation. These channels 208 help to ensure precise alignment and secure attachment, facilitating straightforward installation and removal of the instrument panel components.

A plurality of screws 210 are used to secure the support bracket 204 to the vehicle structure, providing additional stability and support. Additionally, a plurality of side screws 212 are used to further secure the support bracket 204, ensuring a robust and secure attachment. Spring-loaded alignment guides 218A, 218B ensure that the modular components are correctly positioned during installation. These guides help maintain precise alignment, ensuring that the components fit together seamlessly and function as intended. Locking mechanisms 220A, 220B are used to secure the modular components in place once they have been installed. These mechanisms ensure that the components remain securely attached to the outer instrument panel 202, even under dynamic conditions.

As will be explained in further detail below (see FIGS. 6A-6H), during installation, the support bracket 204 is initially positioned and secured to the vehicle structure using a plurality of screws 210. The mounting bracket 214 is then attached to the support bracket 204 using a plurality of side screws 212, ensuring a secure connection to the vehicle structure. The outer instrument panel 202 is aligned with the channels 208 and spring-loaded alignment guides 218A, 218B on the support bracket 204 and mounting bracket 214. The panel is then slid into position along these guides, ensuring precise alignment. Once the outer instrument panel 202 is in place, it is further secured using a plurality of screws 216 that attach it to the support bracket 204 and mounting bracket 214. This step ensures that the panel is firmly attached to the vehicle structure. Any final adjustments are made to ensure that the outer instrument panel 202 is properly aligned and securely fastened. The spring-loaded alignment guides 218A, 218B help maintain the correct position during this process. The locking mechanisms 220A, 220B are engaged to ensure that the outer instrument panel 202 remains securely in place during vehicle operation.

Figure 3:
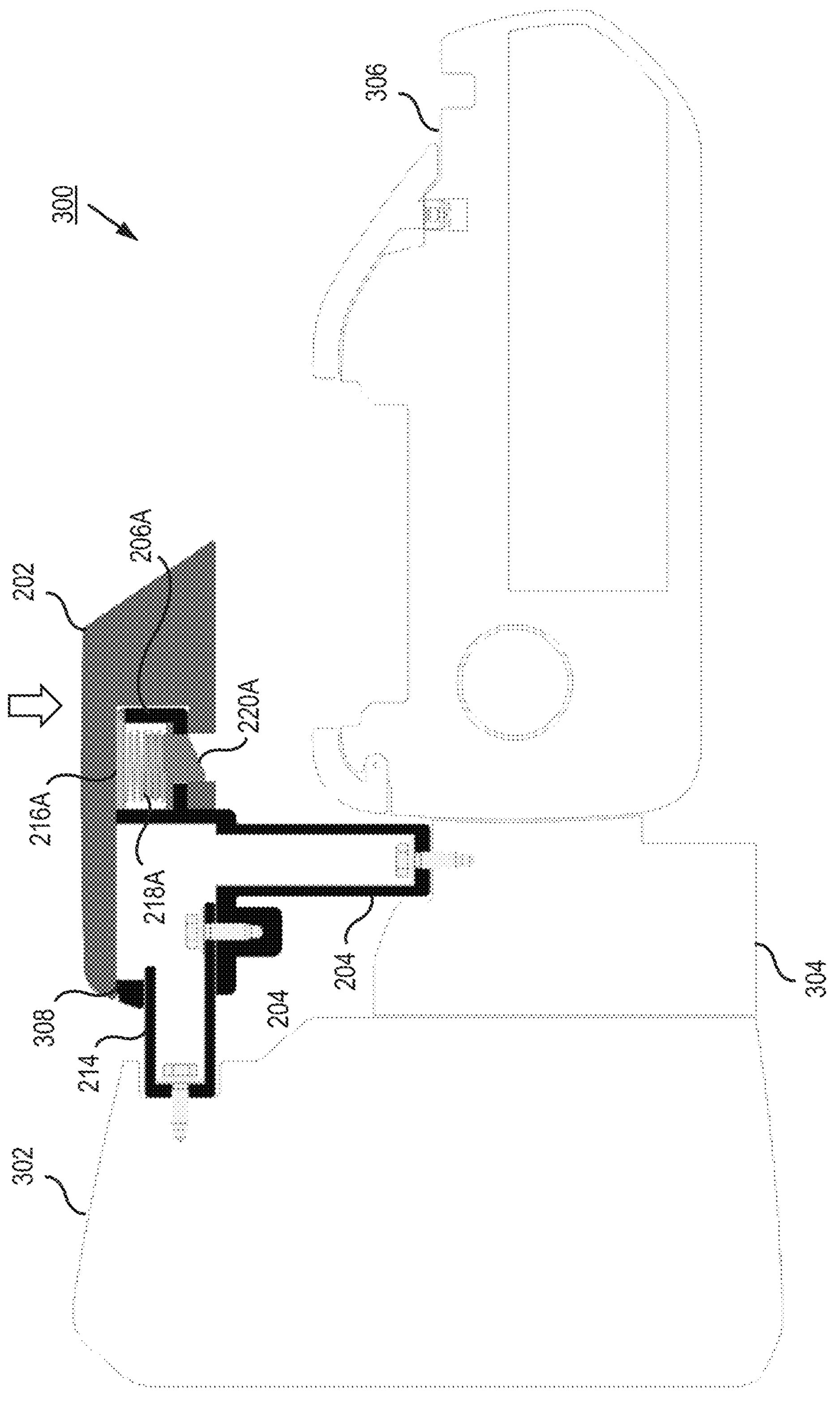
FIG. 3 is a side cross-sectional view of an instrument panel assembly, illustrating an attachment mechanism for an instrument panel comprising mounting the instrument panel along a horizontal axis through a guide, secured by a spring latch, according to some aspects of the present disclosure.

FIG. 3 is a side cross-sectional view of an instrument panel assembly 300, such as the one illustrated in FIG. 2, according to some aspects of the present disclosure. This figure provides a detailed view of the assembled instrument panel assembly (104), highlighting its attachment to various sections of the vehicle structure.

The instrument panel assembly 300 is shown attached to a first upper dashboard portion 302 and a second lower dashboard portion 304. These portions of the vehicle structure provide the necessary support and anchoring points for the instrument panel assembly 300, ensuring its stability and secure attachment. The first upper dashboard portion 302 is positioned towards the rear of the vehicle's dashboard area (i.e., towards the windshield), providing a secure attachment point for the upper sections of the instrument panel assembly 300. The second lower dashboard portion 304 is positioned below the first upper dashboard portion 302, offering additional support and attachment points for the lower sections of the instrument panel assembly 300. It should be understood by a person having ordinary skill in the art that, while the dashboard portions 302-306 are illustrated as different portions, they may also be configured to be combined together into a single dashboard assembly or alternately partitioned into more (e.g., three or more) portions.

The front dashboard portion 306 corresponds to the inner dashboard side 106 of FIG. 1. This portion of the vehicle structure is designed to align with the instrument panel assembly 300, ensuring a cohesive and ergonomic fit within the vehicle interior. The front dashboard portion 306 provides additional support and stability, particularly for the sections of the instrument panel assembly 300 that are frequently interacted with by the driver and front passenger.

A raised portion 308 may be included to meet with the outer instrument panel 202 when installed. This raised portion 308 helps to ensure a secure and precise fit of the outer instrument panel 202 within the vehicle structure.

The support bracket 204 is configured to secure the outer instrument panel 202. In some examples, the support bracket 204 may be pre-assembled as a unit. This pre-assembled unit is then attached to the first upper dashboard portion 302 and the second lower dashboard portion 304 using a plurality of screws 210. This pre-assembly process ensures a stable and secure foundation for the outer instrument panel 202.

The support bracket 204 features a vertical section designed to interface seamlessly with second lower dashboard portion 304. This section includes a series of strategically arranged mounting apertures to align with the attachment points on the vehicle's dashboard, accommodating screws (e.g., 210) that secure the bracket to the dashboard. Additionally, the vertical section may include reinforced ribs and flanges, which enhance its structural integrity and provide additional support to withstand dynamic forces during vehicle operation.

The horizontal section of the support bracket 204 extends towards the outer dashboard side, creating a platform for attaching the outer instrument panel 202. This section includes multiple attachment points, such as threaded inserts and mounting receptacles 206A, which facilitate the installation of modular components, including spring-loaded alignment guides 218A. The horizontal section is contoured to follow the curvature of the dashboard, ensuring a seamless fit within the vehicle interior. The edges of the horizontal section may be flanged to provide additional rigidity and prevent deformation under load. The flanged edges create a boxed structure that enhances the overall strength of the bracket, ensuring it can support the weight of the outer instrument panel 202 and any attached components.

Spring-loaded alignment guide 218A is visible in the cross-sectional view (alignment guide 218B being hidden), illustrating its role in guiding the outer instrument panel 202 into position during installation. During installation, the spring 218A gets compressed (see downward arrow) and then expands back out to force the panel upwards, ensuring precise alignment and secure attachment. Mounting receptacles 206A are integrated into the support bracket 204 to securely house the spring-loaded alignment guides 218A and related hardware. These mounting receptacles provide a reliable and stable connection for the alignment guides, ensuring they remain securely attached to the support bracket 204, even under dynamic conditions.

The support bracket 204 and mounting bracket 214 are shown in their installed positions, securing the outer instrument panel 202 to the vehicle structure. The plurality of screws 210 and 212 are depicted fastening the support bracket 204 and mounting bracket 214 to the respective dashboard portions, ensuring a stable and secure connection.

Figure 4:
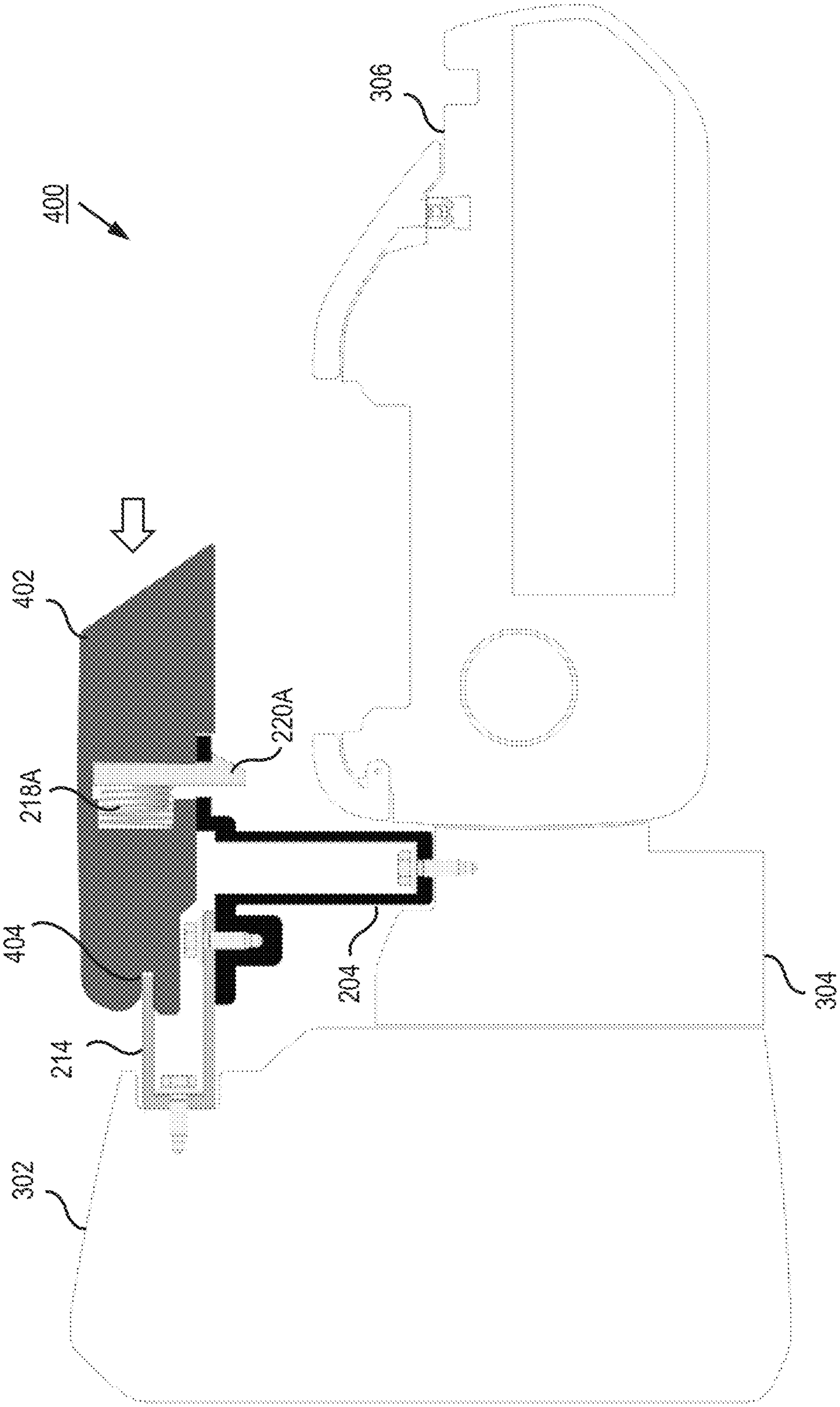
FIG. 4 is a side cross-sectional view of the instrument panel assembly, illustrating another attachment mechanism for an instrument panel comprising mounting by rotating onto a slider rib and securing with a spring latch, according to some aspects of the present disclosure.

FIG. 4 is a side cross-sectional view of an alternate embodiment of the instrument panel assembly 400, according to some aspects of the present disclosure. This figure provides a detailed view of the assembled instrument panel assembly 400, highlighting its attachment to various sections of the vehicle structure, similar to FIG. 3 but with a few notable differences.

The instrument panel assembly 400 in FIG. 4 is shown attached to a first upper dashboard portion 302 and a second lower dashboard portion 304. These portions of the vehicle structure provide the necessary support and anchoring points for the instrument panel assembly 400, ensuring its stability and secure attachment. The first upper dashboard portion 302 is positioned towards the rear of the vehicle's dashboard area (i.e., towards the windshield), providing a secure attachment point for the upper sections of the instrument panel assembly 400. The second lower dashboard portion 304 is positioned below the first upper dashboard portion 302, offering additional support and attachment points for the lower sections of the instrument panel assembly 400.

The front dashboard portion 306 corresponds to the inner dashboard side 106 of FIG. 1. This portion of the vehicle structure is designed to align with the instrument panel assembly 400, ensuring a cohesive and ergonomic fit within the vehicle interior. The front dashboard portion 306 provides additional support and stability, particularly for the sections of the instrument panel assembly 400 that are frequently interacted with by the driver and front passenger.

In this embodiment, the spring-loaded alignment guide 218A and the locking mechanism 220A are configured laterally, forcing the outer instrument panel 402 sideways during installation. This lateral configuration ensures precise lateral alignment and secure engagement of the panel with the vehicle structure. The lateral force applied by the spring 218A ensures that the outer instrument panel 402 aligns correctly with the mounting bracket 214 and the associated interlocking area 404. This lateral alignment helps to position the panel accurately within the vehicle interior, avoiding misalignment that could lead to improper fitting or gaps. The lateral force also enhances stability and security by locking the outer instrument panel 402 into place securely, preventing the panel from shifting or moving during vehicle operation. This interlocking mechanism creates a secure connection that holds the panel firmly in place, preventing it from detaching or becoming loose over time. Additionally, the spring-loaded mechanisms (218A, 218B) aids in the installation process by guiding the panel into the correct position. The lateral force ensures that the panel slides smoothly into place, making it easier for the installer to secure it without needing to apply excessive manual force.

Instead of having a raised portion 308 as in FIG. 3, the embodiment in FIG. 4 features a recess in the outer instrument panel 402 that mates (404) with a portion of the mounting bracket 214 as shown in the figure. This configuration creates a secure interlocking area 404, which holds the outer instrument panel 402 firmly in place.

In some examples, the support bracket 204 may be pre-assembled as a unit and attached to the first upper dashboard portion 302 and the second lower dashboard portion 304 using a plurality of screws 210. This pre-assembly process ensures a stable and secure foundation for the outer instrument panel 402.

In this example, the support bracket 204 features a vertical section designed to interface seamlessly with the second lower dashboard portion 304. This section includes a series of strategically arranged mounting apertures to align with the attachment points on the vehicle's dashboard, accommodating screws 210 that secure the bracket to the dashboard. Additionally, the vertical section may include reinforced ribs and flanges, which enhance its structural integrity and provide additional support to withstand dynamic forces during vehicle operation.

The horizontal section of the support bracket 204 extends towards the outer dashboard side, creating a platform for attaching the outer instrument panel 402. This section includes multiple attachment points, such as threaded inserts and mounting receptacles 206A, which facilitate the installation of modular components, including spring-loaded alignment guides 218A (and 218B, not shown). The horizontal section may be contoured to follow the curvature of the dashboard, ensuring a seamless fit within the vehicle interior. The edges of the horizontal section may be flanged to provide additional rigidity and prevent deformation under load. The flanged edges create a boxed structure that enhances the overall strength of the bracket, ensuring it can support the weight of the outer instrument panel 402 and any attached components.

Spring-loaded alignment guide 218A is visible in the cross-sectional view (alignment guide 218B being hidden), illustrating its role in guiding the outer instrument panel 402 into position during installation. In this embodiment, the spring 218A is configured to force the outer instrument panel 402 sideways, ensuring precise lateral alignment and secure attachment. Mounting receptacles 206A are integrated into the support bracket 204 to securely house the spring-loaded alignment guides 218A and related hardware. These mounting receptacles provide a reliable and stable connection for the alignment guides, ensuring they remain securely attached to the support bracket 204, even under dynamic conditions.

The support bracket 204 and mounting bracket 214 are shown in their installed positions, securing the outer instrument panel 402 to the vehicle structure. The plurality of screws (e.g., 210, 212) are depicted fastening the support bracket 204 and mounting bracket 214 to the respective dashboard portions, ensuring a stable and secure connection.

Figure 5:
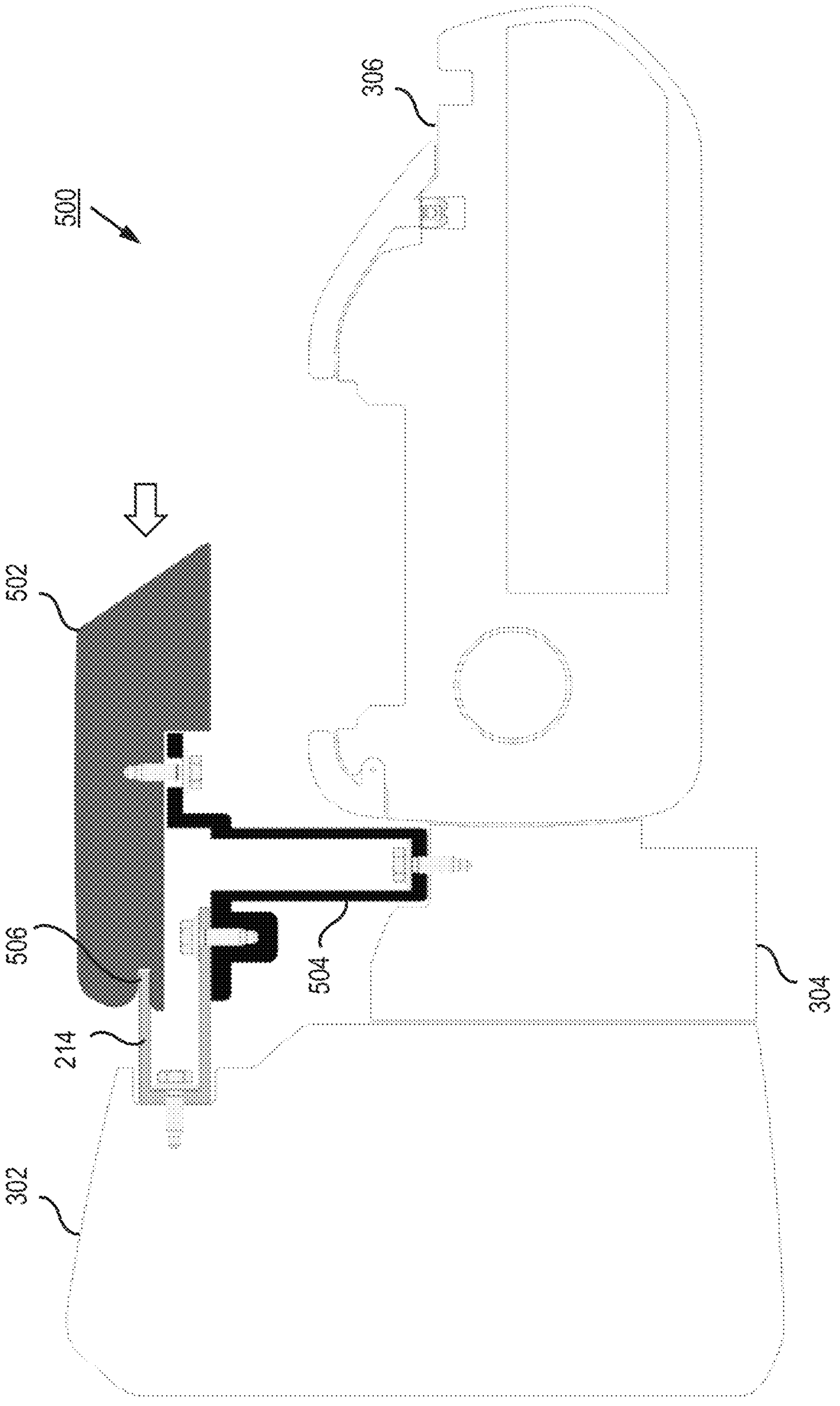
FIG. 5 is a side cross-sectional view of the instrument panel assembly, illustrating yet another attachment mechanism for an instrument panel comprising mounting by rotating onto a slider rib and securing with a screw, according to some aspects of the present disclosure.

FIG. 5 is a side cross-sectional view of another alternate embodiment of the instrument panel assembly 500, according to some aspects of the present disclosure. This figure provides a detailed view of the assembled instrument panel assembly 500, highlighting its attachment to various sections of the vehicle structure, with a different attachment mechanism compared to the examples in FIGS. 3 and 4.

The instrument panel assembly 500 in FIG. 5 is shown attached to a first upper dashboard portion 302 and a second lower dashboard portion 304. These portions of the vehicle structure provide the necessary support and anchoring points for the instrument panel assembly 500, ensuring its stability and secure attachment. The first upper dashboard portion 302 is positioned towards the rear of the vehicle's dashboard area (i.e., towards the windshield), providing a secure attachment point for the upper sections of the instrument panel assembly 500. The second lower dashboard portion 304 is positioned below the first upper dashboard portion 302, offering additional support and attachment points for the lower sections of the instrument panel assembly 500.

The front dashboard portion 306 corresponds to the inner dashboard side 106 of FIG. 1. This portion of the vehicle structure is designed to align with the instrument panel assembly 500, ensuring a cohesive and ergonomic fit within the vehicle interior. The front dashboard portion 306 provides additional support and stability, particularly for the sections of the instrument panel assembly 500 that are frequently interacted with by the driver and front passenger.

In this embodiment, the outer instrument panel 502 is secured using a different mechanism from those in FIGS. 3 and 4. Instead of spring-loaded alignment guides or screw mechanisms, this embodiment features a direct interlocking engagement with the support bracket 504. The support bracket 504 includes features that engage with corresponding structures on the outer instrument panel 202 to secure it in place. The direct interlocking mechanism ensures a stable and secure attachment, preventing the panel from shifting or moving during vehicle operation.

In some examples, the support bracket comprising support bracket 504 may be pre-assembled as a unit and attached to the first upper dashboard portion 302 and the second lower dashboard portion 304 using a plurality of screws (e.g., 210). This pre-assembly process ensures a stable and secure foundation for the outer instrument panel 502.

The support bracket 504 features a vertical section designed to interface seamlessly with the first upper dashboard portion 302. This section includes a series of strategically arranged mounting apertures to align with the attachment points on the vehicle's dashboard, accommodating screws (e.g., 210) that secure the bracket to the dashboard. Additionally, the vertical section may include reinforced ribs and flanges, which enhance its structural integrity and provide additional support to withstand dynamic forces during vehicle operation.

The horizontal section of the support bracket 504 extends towards the outer dashboard side, creating a platform for attaching the outer instrument panel 502. This section includes multiple attachment points, such as threaded inserts which facilitate the installation of modular components including the instrument panel 502. The horizontal section is contoured to follow the curvature of the dashboard, ensuring a seamless fit within the vehicle interior. In the example of FIG. 5, the instrument panel 502 may be inserted in a lateral direction (shown by arrow), where the instrument panel 502 is secured at point 506, and further secured after insertion using the screw (e.g., 210) shown in the figure, configured in an upward direction.

The support bracket 504 and mounting bracket 214 are shown in their installed positions, securing the outer instrument panel 502 to the vehicle structure. The plurality of screws (e.g., 210, 212) are depicted fastening the support bracket 504 and mounting bracket 214 to the respective dashboard portions, ensuring a stable and secure connection.

FIGS. 6A-6H illustrate a sequence of steps for the installation process of the instrument panel assembly 104 within the vehicle interior, according to some aspects of the present disclosure. These figures provide a detailed step-by-step process for one example of installing the instrument panel assembly.

Figure 6A:
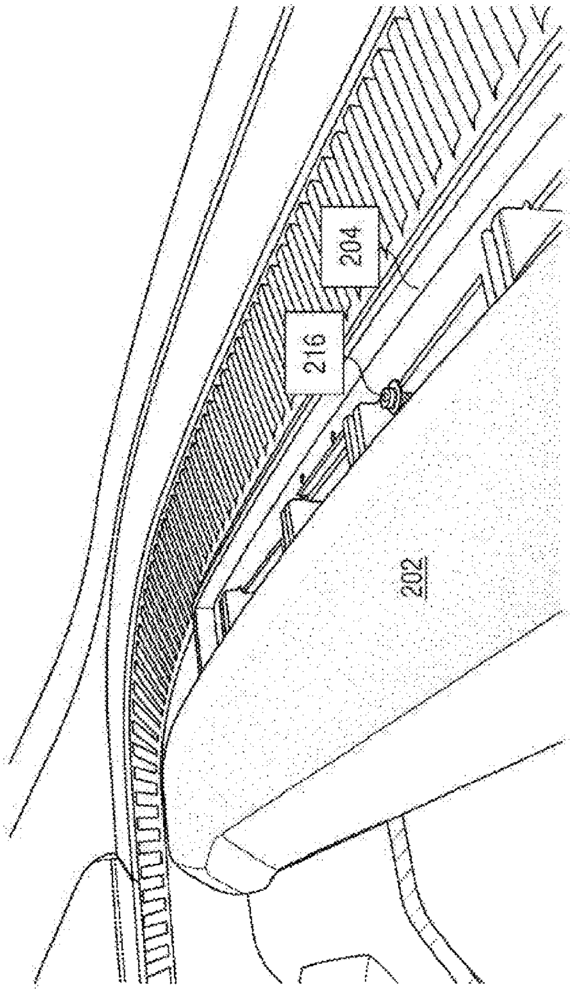
FIGS. 6A-6H are sequential views showing the step-by-step assembly process of the instrument panel components, according to some aspects of the present disclosure, where

FIG. 6A shows the initial positioning of the support bracket 204. The support bracket 204 may be pre-assembled and ready to be attached to the first upper dashboard portion 302 and the second lower dashboard portion 304. The installer aligns the support bracket 204 with the corresponding mounting points on the dashboard portions.

Figure 6B:
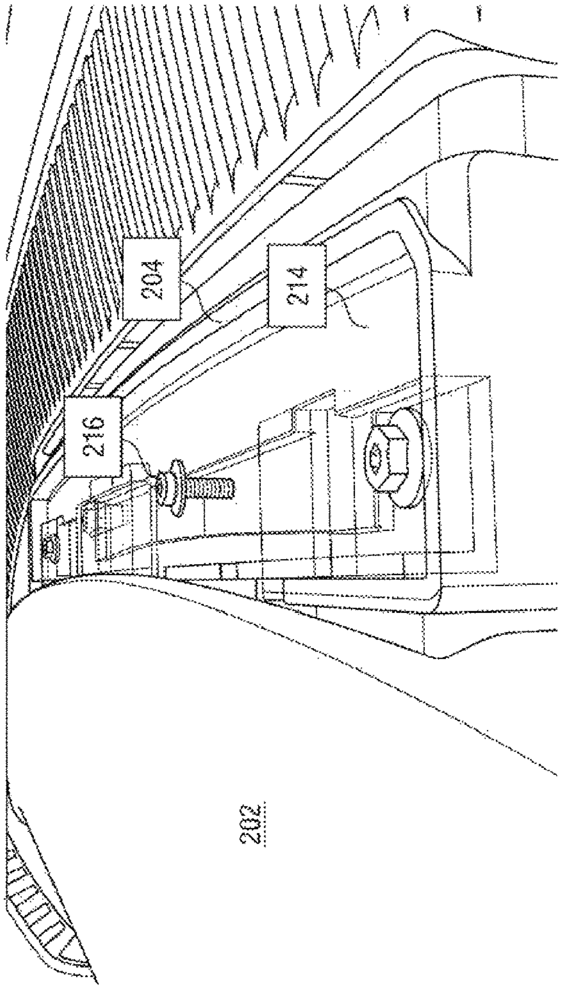

FIG. 6B illustrates the attachment of the support bracket 204 to the first upper dashboard portion 302 and the second lower dashboard portion 304 using a plurality of screws 210. These screws secure the support bracket 204, providing a stable and secure foundation for the outer instrument panel 202.

Figure 6C:
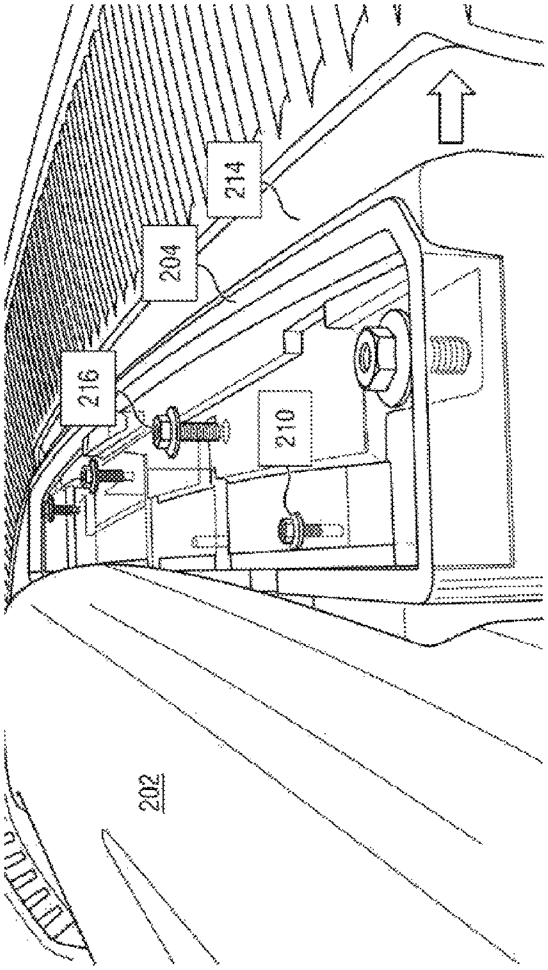

FIG. 6C depicts the mounting bracket 214 being attached to the support bracket 204. The mounting bracket 214 is aligned with the support bracket 204 and secured using a plurality of side screws 212. This step ensures that the mounting bracket 214 is firmly attached and ready to receive the outer instrument panel 202.

Figure 6D:
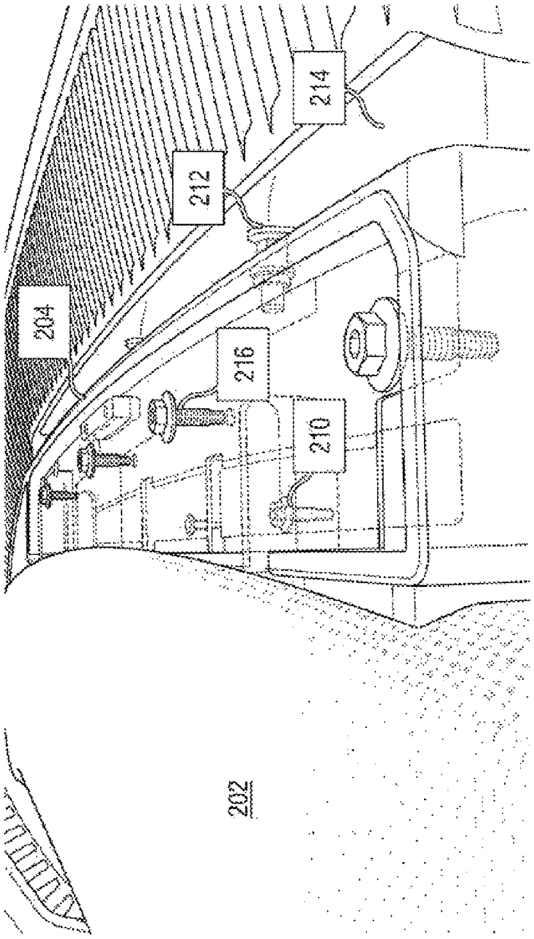

FIG. 6D shows the alignment process for the outer instrument panel 202. The panel is aligned with the channels and spring-loaded alignment guides 218A on the support bracket 204 and mounting bracket 214. This alignment ensures that the panel will slide into place correctly during installation.

Figure 6E:
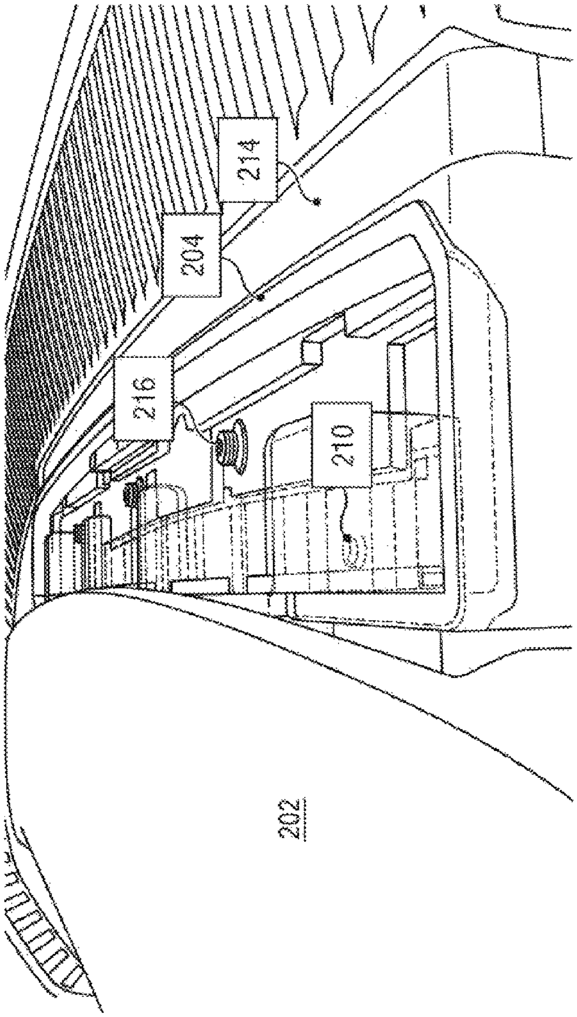

FIG. 6E illustrates the sliding of the outer instrument panel 202 into position along the channels and guides. The installer carefully slides the panel into place, ensuring that it aligns correctly with the support and mounting brackets.

Figure 6F:
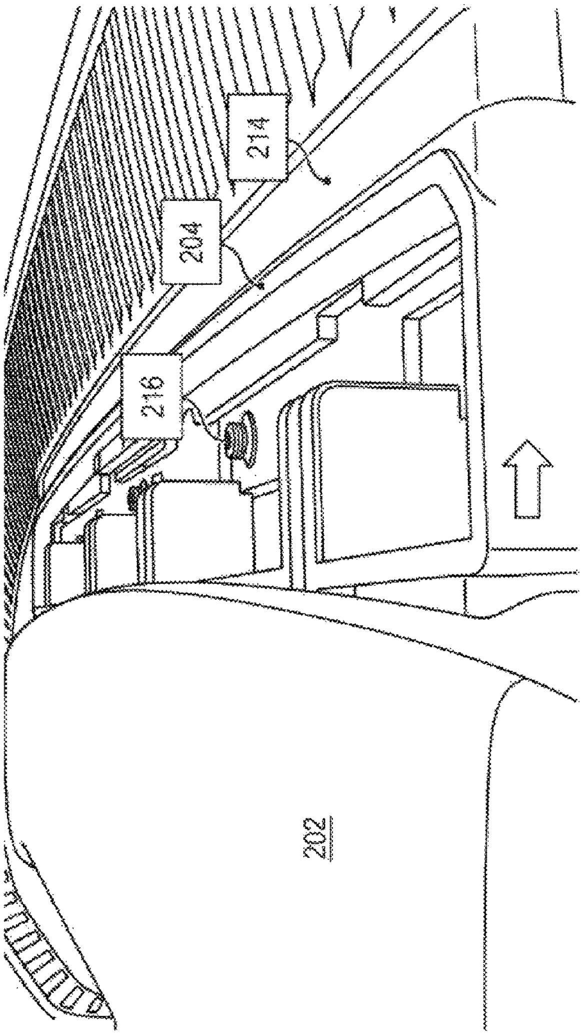

FIG. 6F shows the outer instrument panel 202 fully installed and engaged with the mounting bracket 214. In this position, the spring-loaded alignment guides 218A have ensured precise alignment, and the panel is ready to be secured.

Figure 6G:
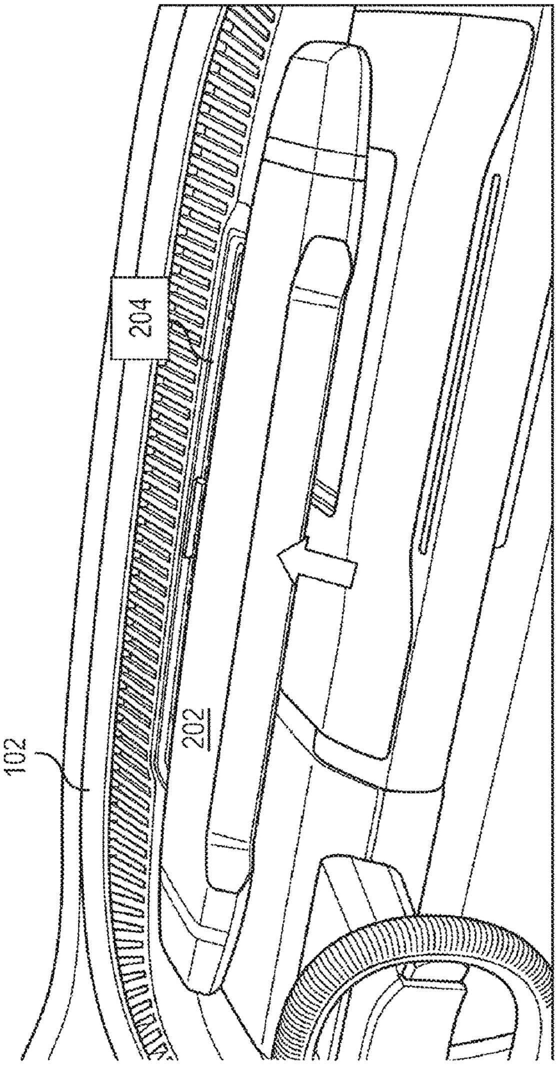

FIG. 6G depicts the final securing of the outer instrument panel 202. A plurality of screws 216 are used to attach the outer instrument panel 202 to the support bracket 204 and mounting bracket 214. This step ensures that the panel is firmly attached and will not shift during vehicle operation.

Figure 6H:
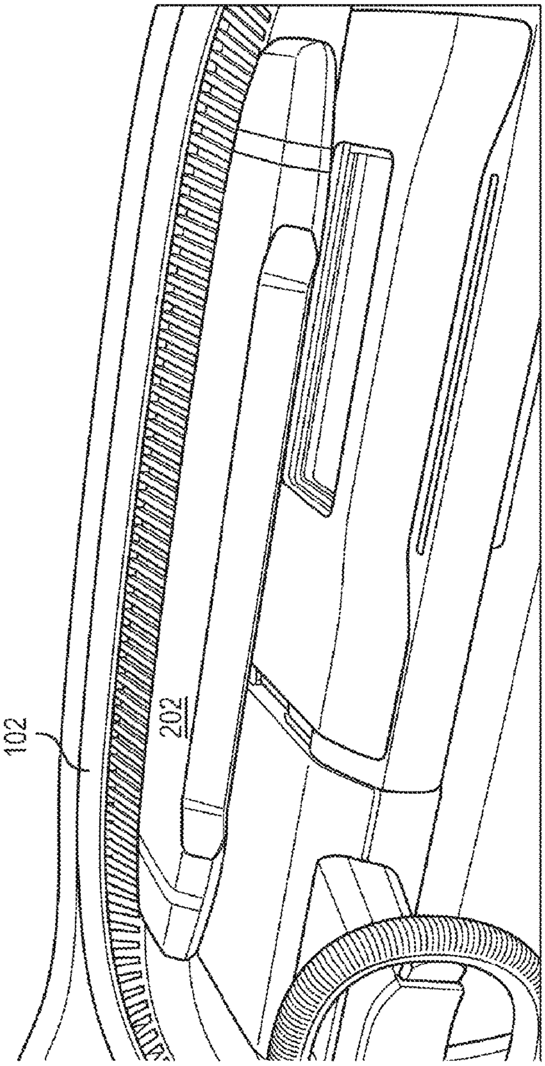

FIG. 6H provides a final view of the fully installed instrument panel assembly 104. The panel is securely attached to the vehicle structure, with all components properly aligned and secured.

In addition to the mechanical attachment mechanisms, the present modular instrument panel assembly is also configured to facilitate easy electrical and/or data connections between the modular components and the vehicle's electrical/data system. This may be achieved through the integration of a slider electrical/data connection system, which ensures seamless and secure electrical/data connectivity upon installation of the components. Although the foregoing description uses terms like "electrical connection," those skilled in the art will recognize that this term encompasses both electrical and data connections, including but not limited to Controller Area Network (CAN), Local Interconnect Network (LIN), Media Oriented Systems Transport (MOST), Bluetooth, Ethernet, and similar technologies. These connections can be electrical, data, or a combination of both, either collectively or individually.

In some examples, the slider electrical connection mechanism may include a series of electrical contacts embedded within the guiding channels 208 and the corresponding modular components. These contacts are strategically positioned to align and engage automatically as the modular components are slid into place. The guiding channels 208 incorporate continuous electrical contact strips that run along their length, made of conductive materials such as copper or aluminum, providing a reliable pathway for electrical current. Meanwhile, the modular components, including the outer instrument panel 202 and any attached electronic devices such as displays, control interfaces, sensors, and actuators, are equipped with corresponding connectors. These connectors may be spring-loaded to ensure a firm and stable connection with the contact strips in the guiding channels 208. People having skill in the art will appreciate that other electrical connection mechanism configurations are contemplated in the present disclosure.

As the modular component, for example, the outer instrument panel 202, is aligned with the guiding channels 208, the electrical connectors on the component approach the contact strips within the channels. As the component is slid into place, the self-aligning connectors make initial contact with the electrical contact strips. The spring-loaded nature of the connectors ensures a secure and stable engagement, maintaining continuous electrical connectivity even under dynamic conditions such as vehicle movement or vibrations. Once the component is fully installed and secured mechanically, the electrical connections are automatically established without the need for additional manual wiring or connector engagement. This design simplifies the installation process and reduces the risk of improper connections. The electrical contact strips are connected to the vehicle's main electrical system, allowing for the transmission of power and data signals between the modular components and the vehicle's onboard systems. This setup enables the integration of various electronic functionalities, such as infotainment systems, driver assistance features, and environmental controls, within the modular instrument panel assembly 104.

The slider electrical connection system simplifies the installation and removal of modular components, making it easier to upgrade or replace electronic devices without extensive rewiring. The self-aligning and spring-loaded connectors ensure a consistent and reliable electrical connection, reducing the likelihood of intermittent connections or signal loss. Additionally, the modular nature of the electrical connection system supports a wide range of configurations and functionalities, allowing for customized setups tailored to specific user preferences and technological advancements.

In some examples, the outer instrument panel 202 may house an infotainment display that connects to the vehicle's multimedia system through the slider electrical connection mechanism. As the panel is slid into place, the connectors automatically engage with the contact strips, establishing a secure electrical pathway for both power and data signals. This enables the display to receive input from the vehicle's media control unit and provide output to the driver and passengers seamlessly.

By incorporating these advanced electrical connection features, the present modular instrument panel assembly 104 goes beyond a simple mechanical attachment system, offering a sophisticated and user-friendly solution for integrating modern electronic components into vehicle interiors.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A modular instrument panel assembly for a vehicle, comprising:

- a mounting bracket configured to be affixed to an upper dashboard portion of the vehicle;
- a support bracket configured to attach to the mounting bracket and receive an outer instrument panel, the support bracket comprising:
  - a vertical section with mounting apertures for attaching to a lower dashboard portion of the vehicle;
  - a horizontal section extending towards an outer dashboard side, the horizontal section including multiple attachment points and flanged edges for rigidity;
  - a plurality of spring-loaded alignment guides housed within mounting receptacles integrated into the support bracket, configured to align and secure attachment of the outer instrument panel during installation; and
  - guiding channels integrated into the support bracket for facilitating a sliding motion of the outer instrument panel during installation.

2. The modular instrument panel assembly of claim 1, wherein the spring-loaded alignment guides are configured to force the outer instrument panel vertically during installation, ensuring lateral alignment and secure attachment.

3. The modular instrument panel assembly of claim 1, wherein the spring-loaded alignment guides are configured to force the outer instrument panel laterally during installation, ensuring lateral alignment and secure engagement with the vehicle structure.

4. The modular instrument panel assembly of claim 1, wherein the vertical section of the support bracket comprises reinforced ribs and flanges to enhance structural integrity and provide additional support to withstand dynamic forces during vehicle operation.

5. The modular instrument panel assembly of claim 1, wherein the horizontal section of the support bracket is contoured to follow the curvature of the dashboard to conform to the vehicle interior.

6. The modular instrument panel assembly of claim 1, wherein the mounting bracket comprises a secure interlocking area that mates with a recess in the outer instrument panel to hold the outer instrument panel firmly in place.

7. The modular instrument panel assembly of claim 1, wherein the guiding channels comprise a low-friction surfaces to facilitate the sliding motion of the outer instrument panel during installation.

8. A method for assembling a modular instrument panel assembly for a vehicle, comprising:

affixing a mounting bracket to an upper dashboard portion of the vehicle;

attaching a support bracket to the mounting bracket, the support bracket including:

attaching a vertical section of the support bracket, having mounting apertures, to a lower dashboard portion of the vehicle;

extending a horizontal section of the support bracket towards an outer dashboard side, the horizontal section including multiple attachment points and flanged edges for rigidity;

integrating a plurality of spring-loaded alignment guides within mounting receptacles in the support bracket;

aligning and securing an outer instrument panel during installation using the spring-loaded alignment guides; and facilitating a sliding motion of the outer instrument panel during installation through guiding channels integrated into the support bracket.

9. The method of claim 8, further comprising forcing the outer instrument panel vertically during installation using the spring-loaded alignment guides to ensure vertical alignment and secure attachment.

10. The method of claim 8, further comprising forcing the outer instrument panel laterally during installation using the spring-loaded alignment guides to ensure lateral alignment and secure engagement with the vehicle structure.

11. The method of claim 8, further comprising reinforcing the vertical section of the support bracket with ribs and flanges to enhance structural integrity and provide additional support to withstand dynamic forces during vehicle operation.

12. The method of claim 8, further comprising contouring the horizontal section of the support bracket to follow the curvature of the dashboard to conform to the vehicle interior.

13. The method of claim 8, further comprising mating a secure interlocking area of the mounting bracket with a recess in the outer instrument panel to hold the outer instrument panel firmly in place.

14. The method of claim 8, further comprising providing the guiding channels with low-friction surfaces to facilitate the sliding motion of the outer instrument panel during installation.

15. A modular instrument panel assembly for a vehicle, comprising:

a mounting bracket configured to be affixed to an upper dashboard portion of the vehicle;

a support bracket configured to attach to the mounting bracket and receive an outer instrument panel, the support bracket comprising:

a vertical section with mounting apertures for attaching to a lower dashboard portion of the vehicle;

a horizontal section extending towards an outer dashboard side, the horizontal section including multiple attachment points and flanged edges for rigidity;

a plurality of spring-loaded alignment guides housed within mounting receptacles integrated into the support bracket, configured to align and secure attachment of the outer instrument panel during installation;

guiding channels integrated into the support bracket for facilitating a sliding motion of the outer instrument panel during installation; and a plurality of detachable fasteners configured to securely attach the outer instrument panel to the support bracket, allowing for removal and replacement of the panel.

16. The modular instrument panel assembly of claim 15, wherein the spring-loaded alignment guides are configured to force the outer instrument panel vertically during installation, ensuring lateral alignment and secure attachment.

17. The modular instrument panel assembly of claim 15, wherein the spring-loaded alignment guides are configured to force the outer instrument panel laterally during installation, ensuring lateral alignment and secure engagement with the vehicle structure.

18. The modular instrument panel assembly of claim 15, wherein the vertical section of the support bracket comprises reinforced ribs and flanges to enhance structural integrity and provide additional support to withstand dynamic forces during vehicle operation.

19. The modular instrument panel assembly of claim 15, wherein the horizontal section of the support bracket is contoured to follow the curvature of the dashboard to conform to the vehicle interior.

20. The modular instrument panel assembly of claim 15, further comprising an integrated electrical connection system configured to establish electrical connectivity between the outer instrument panel and the vehicle's electrical system during installation.

* * * * *